Nov. 25, 1969          M. W. SHAFER          3,480,385
PROCESS FOR GROWING SINGLE CRYSTALS
Filed Nov. 29, 1965

INVENTOR
MERRILL W. SHAFER
BY
ATTORNEY

United States Patent Office 3,480,385
Patented Nov. 25, 1969

3,480,385
PROCESS FOR GROWING SINGLE CRYSTALS
Merrill W. Shafer, Yorktown Heights, N.Y., assignor to International Business Machines Corporation, Armonk, N.Y., a corporation of New York
Filed Nov. 29, 1965, Ser. No. 510,275
Int. Cl. C01b *9/08;* C01f *17/00;* C01g *49/06*
U.S. Cl. 23—20  5 Claims

ABSTRACT OF THE DISCLOSURE

Large, pure single crystals of rare earth and transition element halides or oxides are grown by reduction or oxidation reactions under isothermal conditions. A compound $AB_2$, where A is a metal selected from multivalent rare earth and transition elements and B is an element selected from the halogens and oxygen is heated to its molten temperature and isothermally subjected to an atmosphere of hydrogen, in the case of a reduction reaction, or oxygen where oxidation is desired. The compound AB formed by the reduction or oxidation of $AB_2$ grow as single crystals in the molten compound $AB_2$.

---

Figure 1:
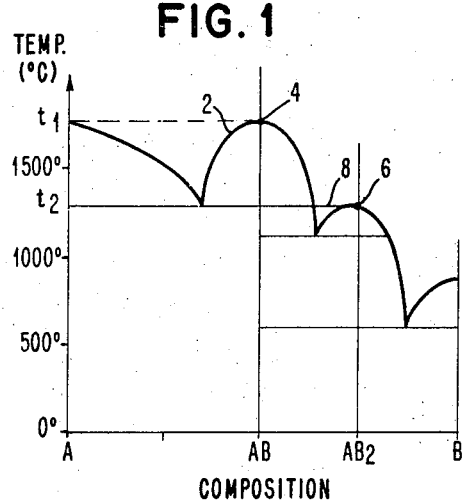

This invention relates to a method of growing large, pure, single crystals of compounds and, more particularly, for isothermally growing a compound directly from its liquid phase to its solid phase.

In the general study of phase diagrams containing congruently melting compounds (the congruent melting point is that point of a phase diagram where a solid compound melts into a liquid of the same composition), it is often found that they melt at very high temperatures. Assume that the desired compound in crystalline form is AB and the congruent melting temperature of the compound is $t_1$. A difficulty arises when $t_1$ is too high a temperature to permit proper crystallization of AB from the liquid phase to the solid phase because such high temperature may (a) cause the liquid phase of AB to react with the walls of the container to contaminate such compound, or (b) such high temperature will lead to disassociation prior to solidification, namely, AB (solid)→AB (vapor), or AB (solid)→A solid+B vapor.

Even when a compound melts incongruently (upon melting, its liquid composition is different from its solid composition) at a low temperature, upon cooling, it is unlikely that the crystalline phase will be the desired phase or contain useful crystals.

In order to avoid the inherent difficulties set out in both cases noted above, the present invention employs a technique for growing crystals wherein an initial undesired compound is heated to its melting point, which is a melting point lower than that of the desired compound, and then is isothermally reduced to the desired compound. As will be explained hereinafter, the general effect of the reaction AB→AB+B is to obtain the desired compound AB directly from the liquid phase of $AB_2$ without the deleterious effects set forth in the cases described above.

To carry out the reaction noted immediately above, the compound AB must be a stable form of the compound and B must disappear as volatile gas. It has been discovered that the rare earth di-halides are particularly capable of being grown as large, single, pure crystals employing such reaction. Besides the rare earth halides, other elements that exist in more than one oxidation state, such as the transition elements, can be grown by isothermal reduction of a compound from its liquid phase directly to its solid phase. The invention also embraces the formation of crystalline compounds by oxidation of compounds rather than reduction of compounds during the transition from the liquid phase to the solid phase.

It is an object of this invention to grow large, pure, single crystals of compounds containing elements having plural oxidation states.

It is a further object to obtain large, pure, single crystals of compounds at temperatures below which they usually melt.

Yet another object is to obtain large, pure, single crystals of compounds, employing the principles of this invention, by oxidation as well as by reduction.

It is still another object to grow crystals of desired compounds isothermally from the liquid phase of a melt of a composition different from that of the desired compound.

The foregoing and other objects, features and advantages of the invention will be apparent from the following more particular description of preferred embodiments of the invention, as illustrated in the accompanying drawings.

FIG. 1 is a phase diagram showing a compound AB having a relatively high congruently melting point $t_1$ and another congruently melting compound $AB_2$ with a lower melting point $t_2$.

Figure 2:
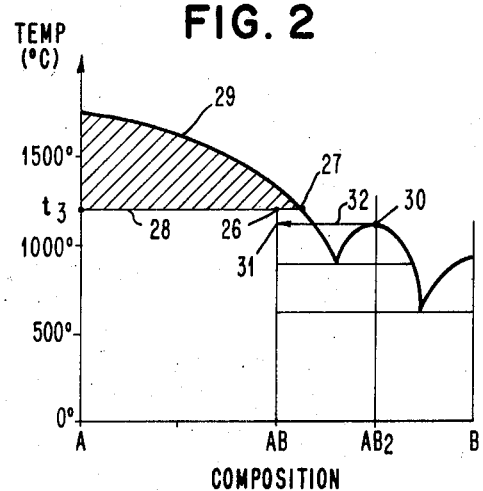

FIG. 2, similar to FIG. 1, is a phase diagram showing an incongruently melting compound AB and a congruently melting compound $AB_2$.

Figure 3:
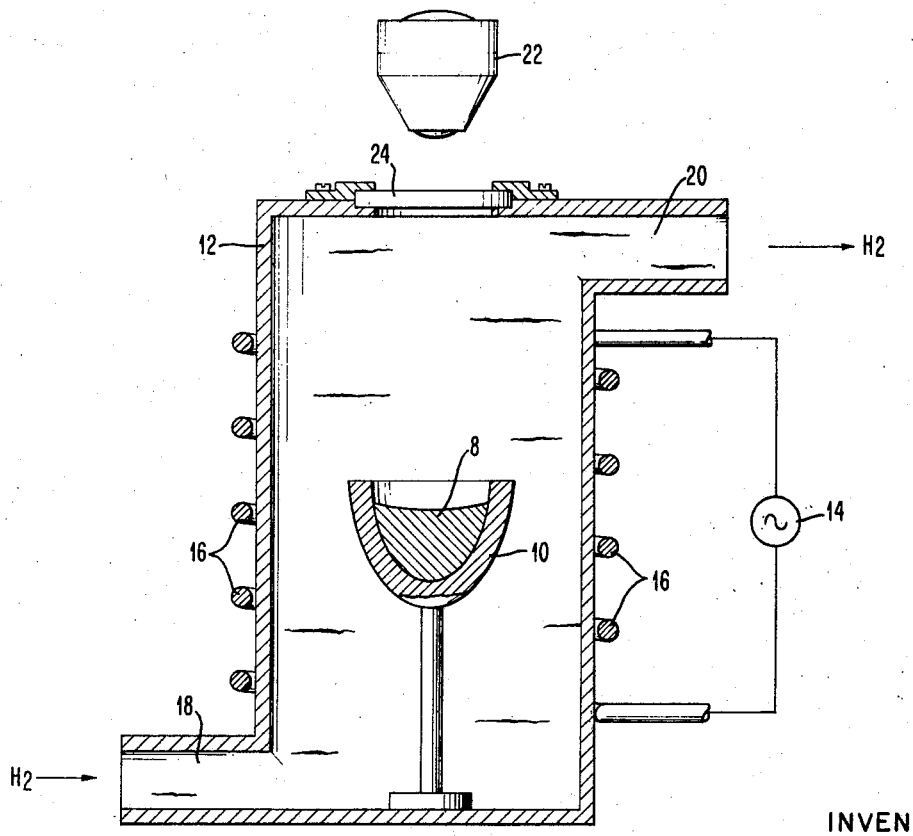

FIG. 3 is a schematic showing of a furnace for growing the large, single, pure crystals of a desired compound.

FIG. 1 is a plot of composition v. temperature wherein A and B are elements and points along the abscissa represent different combinations of elements A and B. The curve 2 represents the liquidus curve, above which everything is in the liquid phase. Points 4 and 6 represent two congruent melting points of the phase diagram and locate two points where a solid compound of two elements melts to a liquid of the same composition. Thus, at point 4, the compound AB is in equilibrium with a liquid at temperature $t_1$. At point 6, the compound $AB_2$ is in equilibrium with liquid at temperature $t_2$.

Assume that the compound AB is the compound that is desired in crystalline form. If the desired compound AB has a very high congruent melting point, it is difficult to grow large, single, pure crystals of the compound because (a) such high temperatures will cause or tend to cause the molten compound AB to react with the walls of the vessel containing the compound or liquid; or (b) such high temperatures will vaporize the compound prior to the cooling step so that disassociation of the desired compound will occur; e.g., AB (solid)→A (solid)+B (vapor) or B (solid)+A (vapor). In order to obtain the desired solid compound AB, I start with an undesired composition $AB_2$ which has a congruently melting point 6 that, at temperature $t_2$, is all liquid. Then the undesired compound, in the liquid state, is reduced, by the use of a reducing agent, isothermally (see line 8 of FIG. 1) so that the desired solid crystal AB is obtained by the reaction $AB_2$→AB+B (gas). In effect, AB, the desired compound, is obtained directly from the liquid phase, and is obtainable at a lower melting temperature than the melting point of the desired compound itself.

FIG. 3 is a schematic showing of a furnace for growing large, single, pure crystals of divalent rare earth halides. By way of illustrating the invention, the growth of $EuF_2$ crystals will be described, it being understood that the invention applies to the growth of MX crystals, where M is a divalent rare earth (europium, samarium, ytterbium) and X is a halogen (fluorine, chlorine, bromine and iodine). Pellets of $EuF_3$ 8 are placed in crucible 10, which is electrically conductive, inside a suitable furnace 12 and radio-frequency energy from source 14 is supplied to coils 16 to inductively heat the $EuF_3$ to its molten state. The $EuF_3$ is maintained at or above its melting temperature of 1300° C. Hydrogen gas is introduced at an inlet port 18 and exits from the furnace at outlet port 20. This following reaction takes place, namely, $EuF_3$ (liquid) $+\frac{1}{2}H_2 \rightarrow EuF_2$ (crystal) $+HF\uparrow$ (gas). As is seen in FIG. 1, $EuF_3$ can be the undesired compound and $EuF_2$ the desired compound. Since $EuF_3$ melts at a lower temperature than $EuF_2$, the $EuF_3$ is melted at $t_2$. Then the $EuF_3$ is reduced to $EuF_2$ isothermally by the use of hydrogen gas, causing the molten undesired $EuF_3$ to become a crystal of the desired compound $EuF_2$ which melts at $t_1$, going directly from the liquid phase to the solid phase. The crystal of $EuF_2$ assumes the shape of the crucible 10 in which it is formed. The rate of crystal growth of $EuF_2$ is controlled by adjusting the amount of hydrogen introduced into the furnace 12. The formation of the $EuF_2$ crystal can be observed through an appropriate viewer 22 placed at a window 24 in furnace 12.

Large, single crystals of $EuF_2$ are particularly desirable because they have high Faraday rotations (Verdet constants) and are also very low absorbers of infra-red energy. The growth of other rare earth compounds under isothermal conditions is also attainable save that different initial melting point temperatures are employed and reducing agents other than hydrogen can be used. In general, since high temperatures and high vapor pressures of individual compounds whose solid crystals are sought are detrimental to the growth of such solid crystals, it is advantageous to start with a compound that can melt at a much lower temperature than the desired compound and then isothermally reduce the undesired compound to the desired compound; such reduction takes place directly from the liquid phase to the solid phase and the reducing agent is disposed of in the form of a gas, as are other undesirable products which are formed, leaving behind in the reaction vessel large, single crystals of the desired compound.

Besides the divalent rare earths, those elements that exist in more than one oxidation state can be reduced isothermally at lower than normal temperatures, employing the teaching of this invention; e.g., the transition elements, such as numbers 22–28 of the first series, 40–46 of the second series, and 72–78 of the third series of the Period Table of Elements, can be grown as solid crystals. The general reaction formula for such transition metals is $ZX_n + (H) \rightarrow ZX_{n-1} + HX\uparrow$ where Z is a transition metal, X is a particular halide and H is a reducing agent, such as hydrogen. For a specific transition metal such as manganese, the reduction of $MnF_3$ to $MnF_2$ occurs as follows: $MnF_3 + HF + H \rightarrow MnF_2 + 2HF\uparrow$. $MnF_3$ has a lower melting point than $MnF_2$ so that by hydrogen reduction one obtains the crystals of $MnF_2$ (the desired crystal) by starting with a melt of the undesired compound $MnF_3$ at a temperature lower than the melting point of $MnF_2$. The isothermal reduction from liquid to solid now occurs at lower temperatures, diminishing the possibility of crucible contamination or disassociation.

The invention can also be carried out employing the oxidation of an undesired compound instead of its reduction to obtain the crystals of a desired compound. For example, if $Fe_3O_4$ is the desired single crystal, then $3FeO + \frac{1}{2}O_2 \rightarrow Fe_3O_4$; FeO, the undesired compound, can be melted at a lower temperature than the desired compound $Fe_3O_4$ so that the isothermal growth of the crystal $Fe_3O_4$ produces a transition from the liquid phase directly into the solid phase of $Fe_3O_4$. Such isothermal reaction occurs when the oxygen content of the gas phase over the molten iron oxide is increased.

There are certain cases, such as incongruently melting compounds, where one can go from the liquid phase to the solid phase at relatively low temperatures so that the possible contamination and disassociation noted hereinabove are not problems of crystal growth. However, in going from the liquid phase to the solid phase, one obtains the liquid phase of the desired compound, but upon cooling to room temperature, the solid phase of the desired compound is not obtained. A phase diagram of the aforementioned difficulty is depicted in FIG. 2 of the drawings.

Assume that at temperature $t_3$, one is at point 26 of the phase diagram, such point 26 representing the temperature at which the compound AB melts to a composition of solid A and liquid 27. Upon cooling a composition AB from a point where it is all liquid, namely, above curve 29, the first crystals to form will be A; all of which will not dissolve, and upon further cooling will coexist with AB, for example, such as point 31 below line 28. Such coexistence is undesirable. As depicted in FIG. 2, it is also desirable to obtain a conjugate melt of the undesired compound, such as $AB_2$ above point 30, and then isothermally (along line 32) reduce the liquid phase of the undesired compound $AB_2$ to the desired solid compound AB, the latter being, upon cooling to room temperature, a large, single, pure crystal of compound AB and assumes the shape of the vessel in which it is melted. In general, as seen in FIG. 2, even when one can obtain a melt of the desired compound at a sufficiently low temperature $t_3$ that avoids contamination with refractory crucibles, the cooling of the melt will not result in a solid of the desired compound since it is cooled from a temperature at which crystals of A are formed which will contaminate the desired compound AB. By holding the melt at a lower temperature, an undesired compound $AB_2$ can be reduced to the desired compound AB, the surplus element B being removed in volatile form either alone or in combination with an agent that reduces $AB_2$ to AB.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of growing single crystals of an AB compound wherein A is a rare earth element selected from the group consisting of Eu, Sm and Yb and B is a halogen, said compound having a higher melting point than a compound $AB_2$, comprising the steps of:
   (a) heating said compound $AB_2$ to and maintaining it at about its molten temperature, and
   (b) continuously adding hydrogen to said molten compound while maintaining isothermal conditions until the compound AB is obtained in the form of a single crystal and continuously venting reaction by-product as a volatile compound of halogen and hydrogen.

2. The method of claim 1 wherein the compound produced is $EuF_2$ and the starting compound is $EuF_3$.

3. A method of growing single crystals of a $ZX_{n-1}$ compound wherein Z is a transition metal selected from the group consisting of elements 22–28 of the first series, 40–46 of the second series and 72–78 of the third series of the Periodic Table of Elements and X is a halogen, said compound having a higher melting point than a compound $ZX_n$, comprising the steps of:
   (a) heating said compound $ZX_n$ to and maintaining it at about its molten temperature,
   (b) continuously adding hydrogen to said molten compound while maintaining isothermal conditions until the compound $ZX_{n-1}$ is obtained in the form of a single crystal, and
   (c) continuously venting reaction by-product as a voltaile compound of halogen and hydrogen.

4. The method of claim 3 wherein the product is $MnF_2$ and is obtained by the isothermal reduction with hydrogen of $MnF_3$.

5. The method of growing single crystals of $Fe_3O_4$ comprising the steps of:
   (a) heating FeO to and maintaining it at about its molten temperature,
   (b) continuously adding oxygen to said molten compound while maintaining isothermal conditions until the compound $Fe_3O_4$ is obtained,
(c) continuously venting reaction by-product, and
(d) gradually cooling said melt to room temperature to thereby obtain a single crystal of said $Fe_3O_4$.

References Cited

UNITED STATES PATENTS

| | | | |
|---|---|---|---|
| 1,865,869 | 7/1932 | Luyken | 23—200 X |
| 2,689,168 | 9/1954 | Dovey et al. | 23—200 |
| 3,057,679 | 10/1962 | Culbertson et al. | 23—21 X |
| 3,272,592 | 9/1966 | Gortsema et al. | 23—88 |

OTHER REFERENCES

Stubblefield et al. "Rare Research," Gordon & Breach, New York, 1962, pp. 29–33.

HERBERT T. CARTER, Primary Examiner

U.S. Cl. X.R.

23—21, 87, 88, 200